US012553346B1

(12) United States Patent
Calvert et al.

(10) Patent No.: US 12,553,346 B1
(45) Date of Patent: Feb. 17, 2026

(54) GAS TURBINE ENGINE WITH ROTATIONAL SPOOL BALANCING SYSTEM

(71) Applicant: Pratt & Whitney Canada Corp., Longueuil (CA)

(72) Inventors: Bruce Calvert, Burlington (CA); Ronald L. Robinson, Brampton (CA); Dave Menheere, Norval (CA); David Beamish, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/075,365

(22) Filed: Mar. 10, 2025

(51) Int. Cl.
*F01D 5/02* (2006.01)

(52) U.S. Cl.
CPC .......... *F01D 5/027* (2013.01); *F05D 2260/15* (2013.01); *F05D 2260/36* (2013.01)

(58) Field of Classification Search
CPC ....................................................... F01D 5/027
See application file for complete search history.

(56) References Cited

U.S. PATENT DOCUMENTS

| | | | |
|---|---|---|---|
| 4,842,485 A | 6/1989 | Barber | |
| 6,481,969 B2 | 11/2002 | Berry | |
| 9,347,321 B2 | 5/2016 | Heidari | |
| 10,145,265 B2 | 12/2018 | Skilton | |
| 10,239,635 B2 | 3/2019 | Nakhjavani | |
| 10,343,784 B2 | 7/2019 | Nakhjavani | |
| 10,954,793 B2 | 3/2021 | Korn | |
| 11,732,585 B2 | 8/2023 | Hagan | |
| 2005/0265846 A1* | 12/2005 | Przytulski | F01D 5/027 416/144 |
| 2024/0183273 A1* | 6/2024 | Harrison | F04D 19/02 |

FOREIGN PATENT DOCUMENTS

| | | |
|---|---|---|
| CN | 206397546 U | 8/2017 |
| CN | 109630204 B | 8/2021 |
| CN | 216381514 U | 4/2022 |
| CN | 116122921 A | 5/2023 |

\* cited by examiner

*Primary Examiner* — Sabbir Hasan
(74) *Attorney, Agent, or Firm* — Getz Balich LLC (57) ABSTRACT

A gas turbine engine is provided that includes a combustor, a rotational spool, a spool balancing system, and at least one access port. The rotational spool includes turbine and compressor sections, and a shaft that connects the turbine and compressor sections. The spool balancing system includes a circumferentially extending track component and a plurality of balance weights that are engaged with the track component. The balance weights are disposable in secured and unsecured configurations. The track component and the balance weights are disposed to rotate with the rotational spool. The access port is disposed within a non-rotational member of the gas turbine engine. The access port is configured to receive a tool for engagement with the balance weights.

20 Claims, 7 Drawing Sheets

GAS TURBINE ENGINE WITH ROTATIONAL SPOOL BALANCING SYSTEM

BACKGROUND OF THE INVENTION

1. Technical Field

The present disclosure relates to gas turbine engines in general and methods and systems for balancing a rotational spool of a gas turbine engine in particular.

2. Background Information

Gas turbine engine rotational spools rotate at high rotational velocities, generating high inertial forces. An imbalance in a rotational spool can lead to vibrations, which in turn can lead to undesirable noise and accelerated engine wear. It would be desirable to have a system and/or method for balancing a rotational spool of a gas turbine engine, particularly one that facilitates the same.

SUMMARY

According to an aspect of the present disclosure, a gas turbine engine is provided that includes a combustor, a rotational spool, a spool balancing system, and at least one access port. The rotational spool includes a turbine section, a compressor section, and a shaft that connects the turbine section and the compressor section. The rotational spool is disposed for rotation about a rotational axis of the gas turbine engine. The spool balancing system includes a circumferentially extending track component and a plurality of balance weights that are engaged with the track component. The balance weights are disposable in a secured configuration or in an unsecured configuration. The track component and the plurality of balance weights are disposed to rotate with the rotational spool. The at least one access port is disposed within a non-rotational member of the gas turbine engine. The at least one access port is configured to receive a tool for engagement with the plurality of balance weights.

In any of the aspects or embodiments described above and herein, the track component may be a circumferentially extending channel disposed in a spool component. In some embodiments, the channel may have a dovetail configuration.

In any of the aspects or embodiments described above and herein, the spool component may be a disk cover plate.

In any of the aspects or embodiments described above and herein, each balance weight may include a portion that is received within the channel.

In any of the aspects or embodiments described above and herein, the spool component has a circumference, and the channel may extend around an entirety of the circumference.

In any of the aspects or embodiments described above and herein, in the unsecured configuration the plurality of balance weights may be translatable around the entirety of the circumference of the spool component.

In any of the aspects or embodiments described above and herein, each balance weight may be actuable between the secured and unsecured configurations.

In any of the aspects or embodiments described above and herein, each balance weight may include an actuation member configured for rotation, and rotation of the actuation member may cause actuation between the secured and unsecured configurations.

In any of the aspects or embodiments described above and herein, the turbine section may be a high pressure turbine section, and the compressor section may be a high pressure compressor section, and the shaft may be a high speed shaft.

In any of the aspects or embodiments described above and herein, the turbine section may be a low pressure turbine section, and the compressor section may be a low pressure compressor section, and the shaft may be a low speed shaft.

According to an aspect of the present disclosure, a gas turbine engine is provided that includes a combustor section, a first rotational spool, a second rotational spool, a first spool balancing system, and at least one first access port. The first rotational spool includes a first turbine section, a first compressor section, and a first shaft that rotationally connects the first turbine section and the first compressor section. The first rotational spool is disposed for rotation about a rotational axis of the gas turbine engine. The second rotational spool includes a second turbine section, a second compressor section, and a second shaft that rotationally connects the second turbine section and the second compressor section. The second rotational spool is disposed for rotation about the rotational axis of the gas turbine engine. The first spool balancing system includes a circumferentially extending first track component and a plurality of first balance weights that are engaged with the first track component. The first balance weights are disposable in a secured configuration or in an unsecured configuration. The first track component and the plurality of first balance weights are disposed to rotate with the first rotational spool. The at least one first access port is disposed within a non-rotational member of the gas turbine engine. The at least one first access port is configured to receive a first tool for engagement with the plurality of first balance weights.

In any of the aspects or embodiments described above and herein, the first track component may be a first channel disposed in a first spool component, and the first spool component has a first circumference. The first channel may extend around an entirety of the first circumference.

In any of the aspects or embodiments described above and herein, the gas turbine engine may include a second spool balancing system that includes a circumferentially extending second track component and a plurality of second balance weights that may be engaged with the second track component. The second balance weights may be disposable in a secured configuration or in an unsecured configuration. The second track component and the second balance weights may be disposed to rotate with the second rotational spool.

In any of the aspects or embodiments described above and herein, the gas turbine engine may include a core gas path and an engine case. The core gas path extends through the first compressor section, the first compressor section, and the first turbine section. The core gas path through the first turbine section may be defined by an outer radial containment structure and an inner radial containment structure. The engine case may be disposed radially outside of the core gas path. The at least one first access port may include a first portal disposed within the engine case, a second portal disposed in the outer radial containment structure, and a third portal disposed in the inner radial containment structure. The first, second, and third portals may be disposed to receive the first tool for engagement with the plurality of first balance weights.

In any of the aspects or embodiments described above and herein, the second track component may be a second channel disposed in a second spool component, and the second spool component may have a second circumference, and the second channel may extend around an entirety of the second circumference. In the second unsecured configuration, the plurality of second balance weights may be translatable around the entirety of the second circumference of the second spool component.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
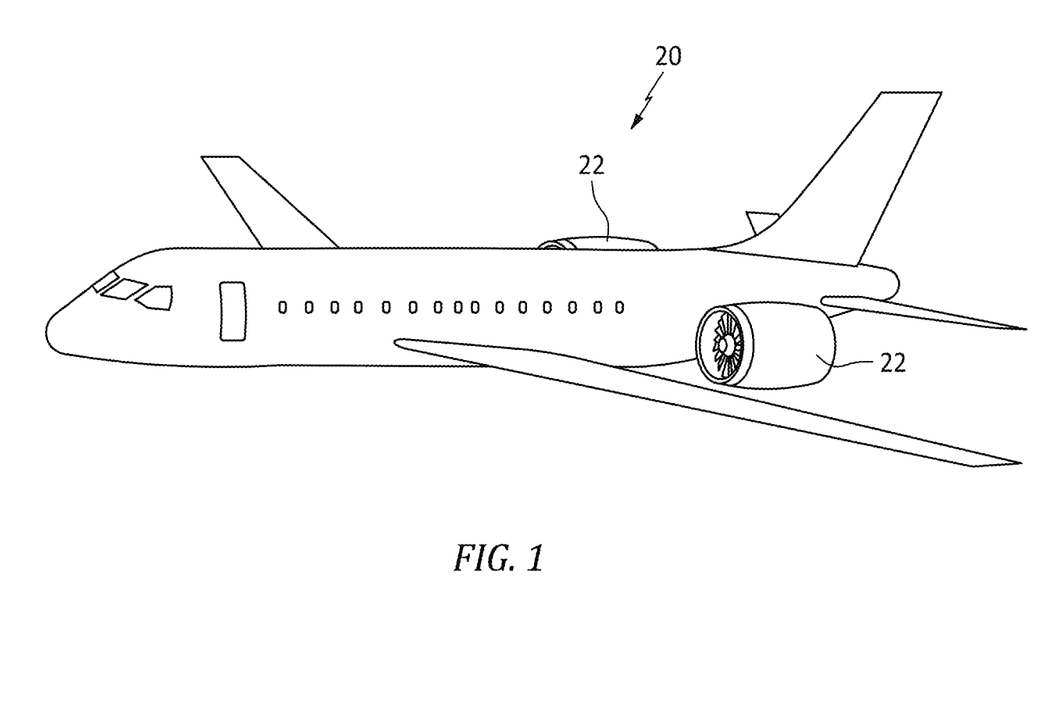
FIG. 1 is a diagrammatic view of an aircraft having a pair of gas turbine engine powerplants.

FIG. 1 illustrates an aircraft 20 that includes a pair of powerplants 22. In this example, the aircraft 20 is shown as a fixed wing aircraft, but the present disclosure is not limited thereto; e.g., the aircraft 20 may be a helicopter, a drone (e.g., an unmanned aerial vehicle (UAV)) or any other manned or unmanned aerial vehicle. The aircraft powerplant 22 may be configured as, or otherwise included as part of, a propulsion system for the aircraft 20. The aircraft powerplant 22 may also or alternatively be configured as, or otherwise included as part of, an electric power system for the aircraft 20.

Figure 2:
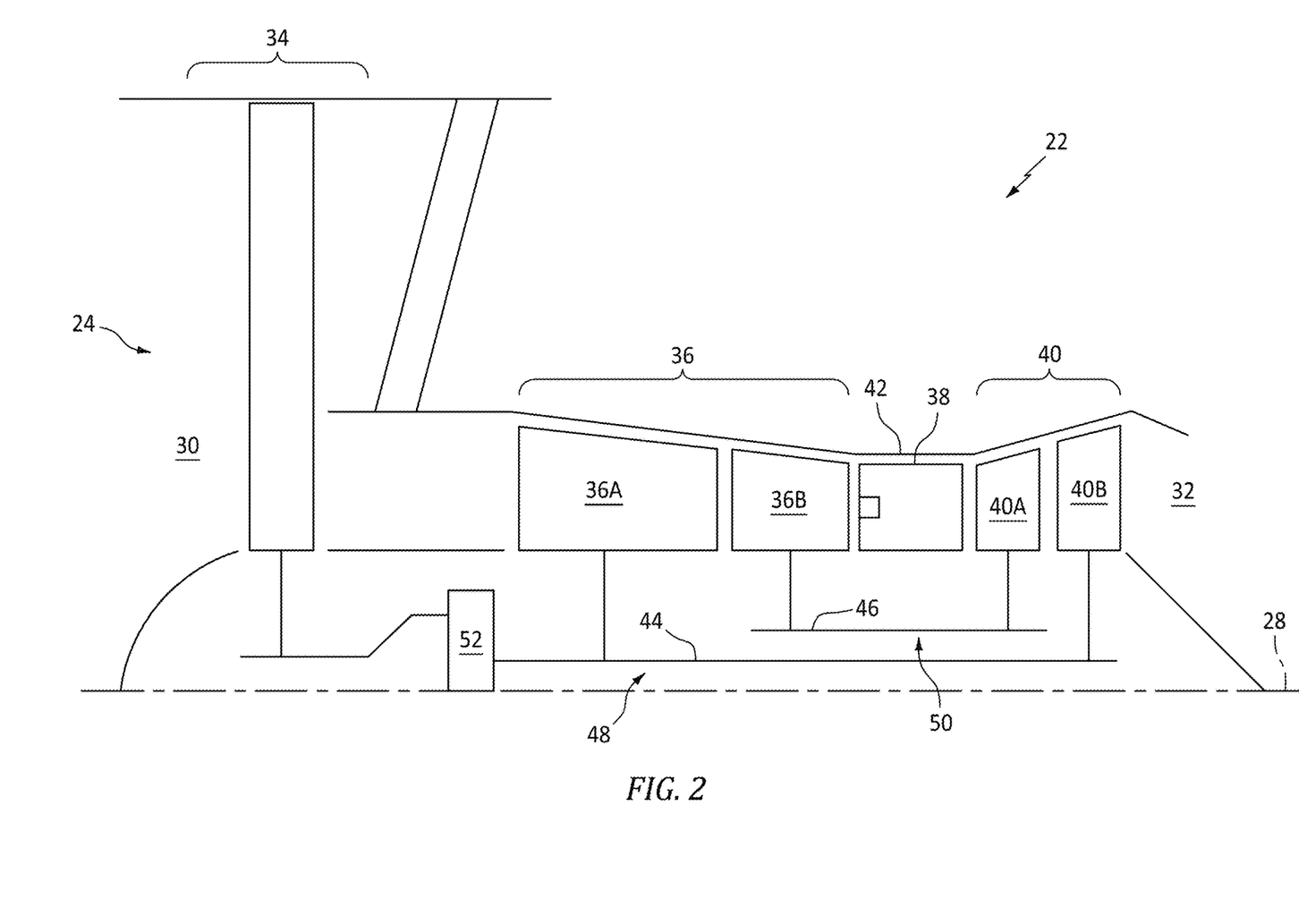
FIG. 2 is a diagrammatic view of a gas turbine engine embodiment.

FIG. 2 diagrammatically illustrates a powerplant 22 that may be used with an aircraft 20 like that shown in FIG. 1. The powerplant 22 includes a mechanical load 24 and a gas turbine engine 26. The mechanical load 24 may include a rotor mechanically driven by the gas turbine engine 26. The driven rotor may be a bladed propulsor rotor where the aircraft powerplant is, or is part of, the aircraft propulsion system. The propulsor rotor, for example, may be an open (e.g., un-ducted) propulsor rotor or a ducted propulsor rotor. Examples of the open propulsor rotor include, but are not limited to, a propfan rotor for a propfan propulsion system, a pusher fan rotor for a pusher fan propulsion system, a propeller rotor for a turboprop propulsion system, and a rotorcraft rotor (e.g., a main helicopter rotor) for a turboshaft propulsion system. Examples of the ducted propulsor rotor include, but are not limited to, a fan rotor for a turbofan propulsion system; e.g., as shown in FIG. 2. Alternatively, the driven rotor may be a generator rotor in an electric power generator where the aircraft powerplant is, or is part of, the electric power system; e.g., an auxiliary power unit (APU) for the aircraft 20.

Referring to FIG. 2, the gas turbine engine 26 extends axially along an axial centerline 28 from an upstream airflow inlet 30 to an exhaust passage 32. The gas turbine engine 26 includes a fan section 34, a compressor section 36, a combustor section 38, and a turbine section 40. The compressor section 36 includes a low pressure compressor section (LPC 36A) section and a high pressure compressor section (HPC 36B). The turbine section 40 includes a high pressure turbine section (HPT 40A) and a low pressure turbine section (LPT 40B). In this engine 26 embodiment, the compressor, combustor, and turbine sections 36, 38, 40 are arranged sequentially along the axial centerline 28 within an engine case 42. The engine case 42 houses the LPC section 36A, the HPC section 36B, the combustor section 38, the HPT section 40A, and the LPT section 40B. The LPC, HPC, HPT, and LPT sections each include at least one rotor stage. A low speed shaft 44 extends between the LPC section 36A and the LPT section 40B. A high speed shaft 46 extends between the HPC section 36B and the HPT section 40A. The LPC and LPT sections 36A, 40B, the low speed shaft 44, and attached hardware collectively may be referred to as a low speed rotational spool 48. The HPC and HPT sections 36B, 40A, the high speed shaft 46, and attached hardware collectively may be referred to as a high speed rotational spool 50. Hence, the gas turbine engine 26 diagrammatically shown in FIG. 1 may be described as a two-spool turbofan disposed about a rotational axis. The low speed rotational spool 48 is in communication with the fan section 34. In some embodiments, the low speed shaft 44 may be in communication with the fan section 34 by way of a geartrain 52. The geartrain 52 may be configured to drive the fan section 34 at a different rotational velocity than the low speed shaft 44. The present disclosure does not require the fan geartrain 52.

The terms "forward" and "aft" are used herein to indicate the relative position of a component or surface. The compressor section 36 is "forward" of the combustor section 38 and the turbine section is "aft" of the combustor section 38. The terms "inner radial" and "outer radial" refer to relative radial positions from the engine centerline 28. An inner radial component or path is disposed radially closer to the engine centerline 28 than an outer radial component or path. The gas turbine engine 26 diagrammatically shown in FIG. 2 is an example provided to facilitate the description herein. The present disclosure is not limited to any particular gas turbine engine configuration.

Figure 3:
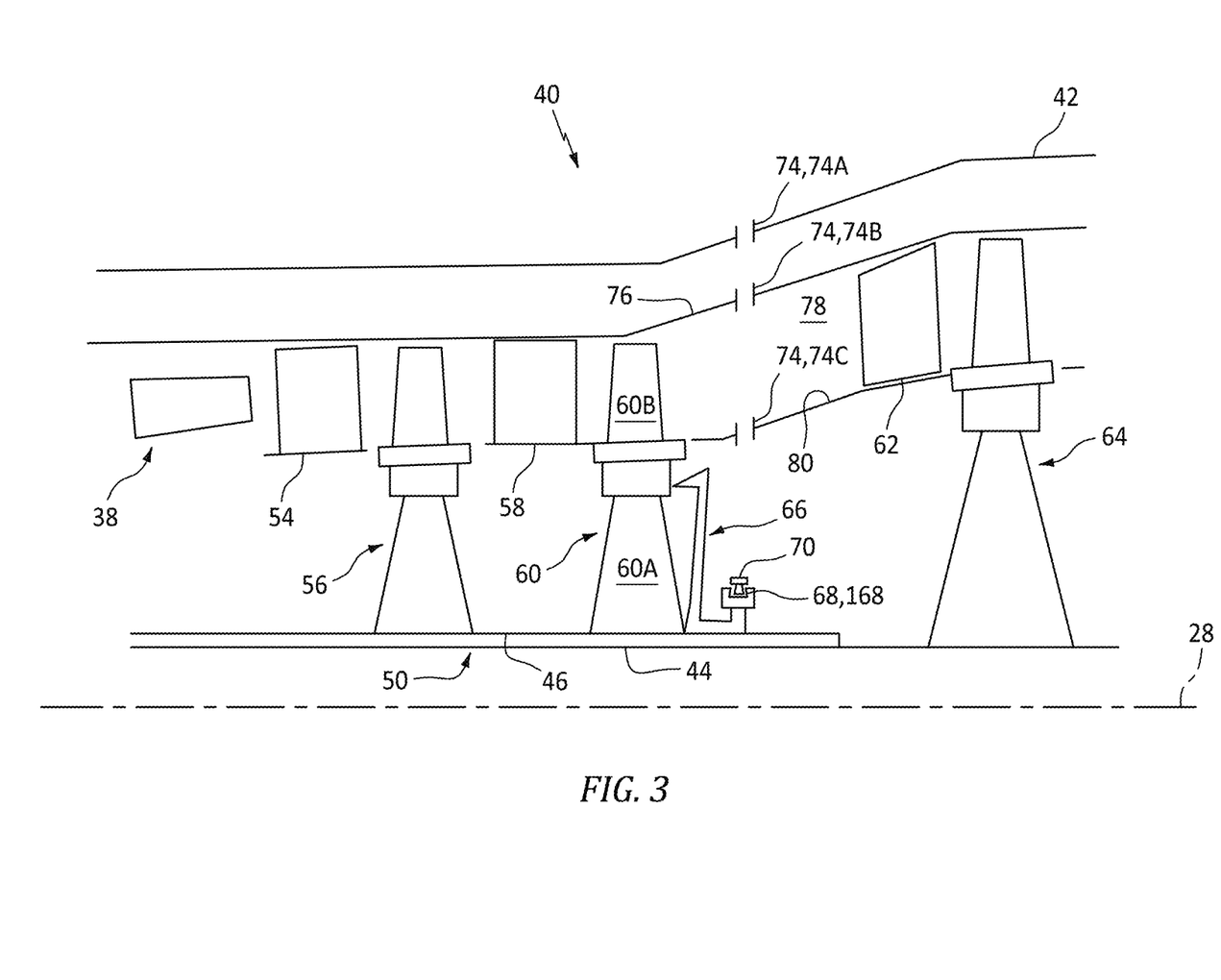
FIG. 3 is a diagrammatic view of a portion of a turbine section of a gas turbine engine.

FIG. 3 diagrammatically illustrates a portion of a turbine section 40 that includes an HPT inlet guide vane stage 54, a first HPT rotor stage 56, a second HPT stator vane stage 58, a second HPT rotor stage 60, a LPT inlet guide vane stage 62, and a first LPT rotor stage 64. Each rotor stage includes a disk and a plurality of rotor blades extending outward from the disk. For example, the second HPT rotor stage 60 includes a second HPT rotor disk 60A and a plurality of second HPT rotor blades 60B. A disk cover plate 66 is attached to the second HPT rotor disk 60A. The first HPT rotor stage 56, second HPT rotor stage 60, and disk cover plate 66 are part of the high pressure rotational spool 50.

As indicated above, an imbalance in a rotational spool can lead to vibrations when the rotational spool is rotated, which in turn can lead to undesirable noise and accelerated engine wear. The present disclosure provides a system and a method for balancing a rotational spool of a gas turbine engine 26.

Embodiments of the present disclosure spool balancing system include at least one circumferentially extending track component 68 and a plurality of balance weights 70 configured to engage with the track component 68. The track component 68 is disposed in a component of a rotational spool 48, 50. A non-limiting example of a track component 68 is a weight channel 168. FIG. 3 illustrates a weight channel 168 disposed within a flange portion of the disk cover plate 66 attached to the second HPT rotor disk 60A. The present disclosure is not limited to having a weight channel 168 disposed in disk cover plate flange. In fact, the weight channel 168 may be disposed at variety of different radial planes relative to the centerline 28 of the engine 26 and/or at a variety of different axial positions along the airflow path of the engine 26. Consequently, the weight channel 168 may be disposed within a number of different components of a rotational spool 48, 50. In those present disclosure spool balancing system embodiments that include more than one weight channel 168, the plurality of weight channels 168 may be disposed at different radial planes and axial positions relative to one another. Utilizing a plurality of track components 68 (e.g., weight channels 168) disposed at different radial planes and axial positions may collectively facilitate spool balancing.

Figure 4:
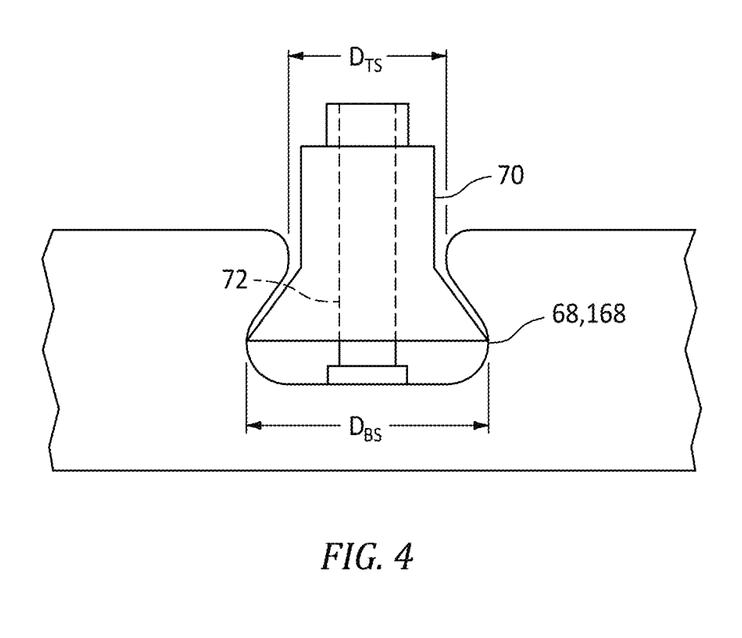
FIG. 4 is a diagrammatic view of a track component embodiment and a balancing weight.

The weight channel 168 embodiment diagrammatically shown in FIG. 4 has a cross-sectional geometry in the form of a shaped cavity; e.g., a dovetail configuration. The shaped cavity includes a throat segment having a side to side opening distance ("$D_{TS}$") and a side to side base segment distance ("$D_{BS}$"). The narrowed throat segment opening is less than the base segment opening; i.e., $D_{TS}<D_{BS}$. The present disclosure is not limited to the example weight channel 168 configuration shown in FIG. 4.

The weight channel 168 and the balance weights 70 are configured so that the weights 70 can be circumferentially translated within the weight channel 168 without the weight 70 separating from the channel 168. Each of the balance weights 70 is disposable in an unsecured configuration or in a secured configuration. In the unsecured configuration, the balance weight 70 can be translated relative to the weight channel 168, or vice versa; i.e., the circumferential position of the balance weight 70 relative to the weight channel 168 may be changed. In the secured configuration, the balance weight 70 is positionally fixed relative to the weight channel 168. In the embodiment diagrammatically shown in FIG. 4, the balance weight 70 includes a fastener 72 that can be actuated (e.g., loosened) to change the balance weight 70 from the secured configuration to the unsecured configuration, or vice versa (e.g., tightened). As stated above, in the secured and unsecured configurations the balance weight 70 and the weight channel 168 remain engaged with one another in a manner that prevents separation therebetween.

The weight channel 168 and balance weight 70 combination shown in FIG. 4 may be described as a mating pair; e.g., the female weight channel 168 receives the male balance weight 70. In an alternative embodiment, the present disclosure may include a track component 68 in the form of a circumferentially extending male element (e.g., a rail-not shown), and include a plurality of balance weights 70, each having a cavity that receives a portion of the male element rail; i.e., an alternative mating geometry for the circumferentially weight channel 168 and the balance weights 70.

To facilitate the description herein, the present disclosure spool balancing system will be described as including a circumferentially extending weight channel 168 configured to receive at least a part of a balance weight 70. In addition, the present disclosure spool balancing system will be described as including a four identical balance weights 70 engaged with the weight channel 168. The present invention is not limited to this example.

Figure 5:
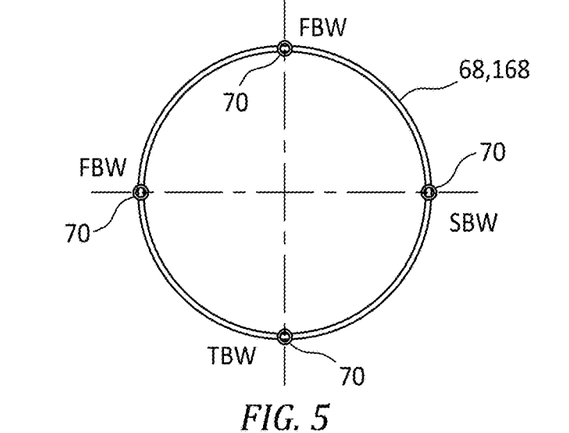
FIG. 5 is a diagrammatic representation of a present disclosure spool balancing system embodiment having a track component and balance weights engaged with the track component at orthogonal circumferential positions.
Figure 5A:
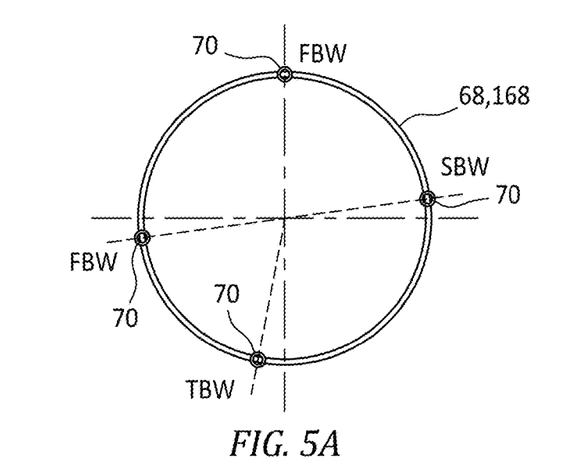
FIG. 5A is a diagrammatic representation of a present disclosure spool balancing system embodiment having a track component and balance weights engaged with the track component at circumferential positions, including positions adjusted from the orthogonal positions.

FIGS. 5 and 5A diagrammatically illustrate a present disclosure spool balancing system with four balance weights 70 engaged with a weight channel 168. In FIG. 5, a first balance weight (FBW) is disposed at the zero degrees (0°) circumferential position, a second balance weight (SBW) is disposed at the ninety degrees (90°)circumferential position, a third balance weight (TBW) is disposed at the one hundred and eighty degrees (180°) circumferential position, and a fourth balance weight (FBW) is disposed at the two hundred and seventy degrees (270°) circumferential position. Since each of the balance weights 70 is assumed to be exactly the same weight, and because the zero and one hundred and eighty degrees circumferential positions are opposition one another, and the ninety and two hundred and seventy degrees circumferential positions are opposite one another, the weights may be described as being in a neutral configuration. When the balance weights 70 are disposed in a neutral configuration, they will have de minimis or no effect on the rotational balance of the spool. In FIG. 5A, the first balance weight (FBW) remains at the zero degrees (0°) circumferential position, and the second balance weight (SBW), the third balance weight (TBW), and the fourth balance weight (FBW) are circumferentially displaced from their original circumferential positions, e.g., as a result of balancing.

When a rotational spool 48, 50 is assembled, the balance weights 70 are engaged with the weight channel 168. The balance weights 70 may be engaged with the weight channel 168 at the orthogonal circumferential positions (i.e., 0°, 90°, 180°, and 270°) but orthogonal circumferential positioning is not required; e.g., balance weights 70 may be initially disposed at specific circumferential positions based on analytics or empirical data collected from similar type gas turbine engines. Regardless of where the balance weights 70 are circumferentially engaged with the weight channel 168, the initial circumferential positions are known.

The present disclosure spool balancing system provides access to the balance weights 70 via one or more ports 74 that are configured to permit access for tooling, e.g., see FIG. 3. The tooling includes any type of tooling (e.g., an Allen wrench, hex head driver, or the like) that can be used to actuate a balance weight 70 from a secured configuration to an unsecured configuration, or vice versa. In some cases, the tooling may include visual inspection tooling, e.g., a boroscope. The specific ports 74 and their positioning will vary depending on where the present disclosure weight channel 168 and balance weights 70 are disposed within the engine 26. FIG. 3 diagrammatically illustrates a first port 74A disposed in the engine casing 42, a second port 74B disposed in the outer wall 76 of the core gas path 78, and a third port 74C disposed in the inner wall 80 of the core gas path 78. The first, second, and third ports 74A, 74B, 74C collectively provide an access path to a circumferential position of the weight channel 168, and therefore balance weights 70 attached to the weight channel 168. Each of these ports 74A, 74B, 74C may be configured to be disposed in a closed configuration (no passage permitted therethrough) or in an open configuration (passage permitted therethrough). For example, during operation of the gas turbine engine 26 the ports 74A, 74B, 74C may be disposed in the closed configuration, and when the engine 26 is being inspected (i.e., non-operational state), the ports 74A, 74B, 74C may be disposed in the open configuration to permit tooling to be inserted therethrough.

Figure 6:
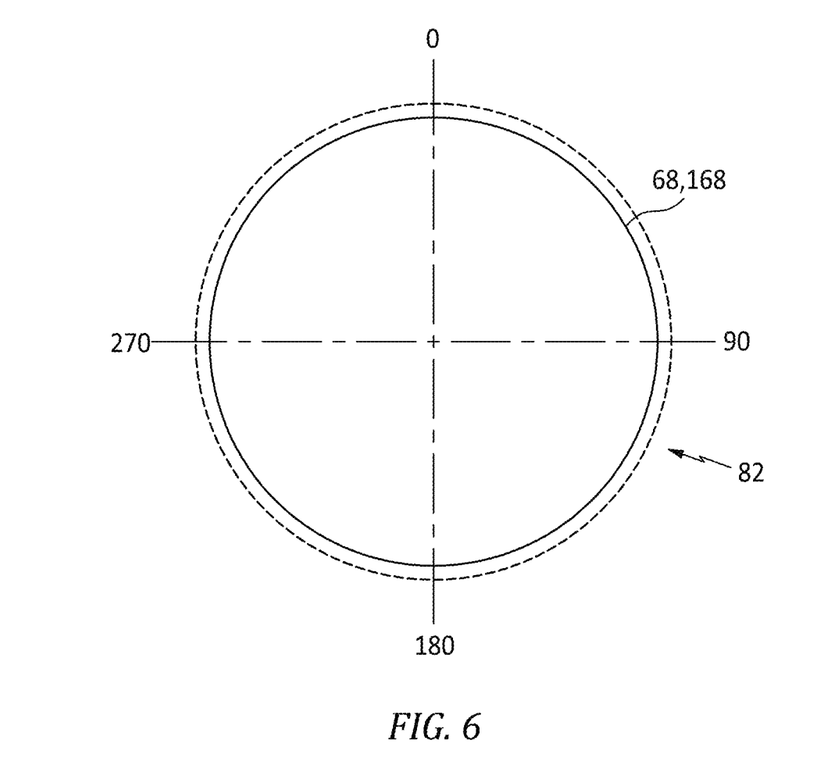
FIG. 6 is an example of a circumferential position indicator embodiment.

The rotational spool 48, 50 may include or be in communication with a circumferential position indicator 82. For example, the rotational spool 48, 50 may include a visual circumferential position indicator 82 that indicates circumferential position of the rotational spool 48, 50 in terms of degrees, e.g., the orthogonal axis positions (i.e., 0°, 90°, 180°, and 270°)—see FIG. 6. Alternatively, circumferential positioning of the rotational spool 48, 50 may be determined using a mechanical or an electro-mechanical sensor. Regardless of the type of circumferential position indicator, the indicator provides sufficient information to enable a person to locate a circumferential position on the weight channel 168 and move a balance weight 70 to the identified circumferential position. The present disclosure is not limited to any particular circumferential position indicator.

Figure 7:
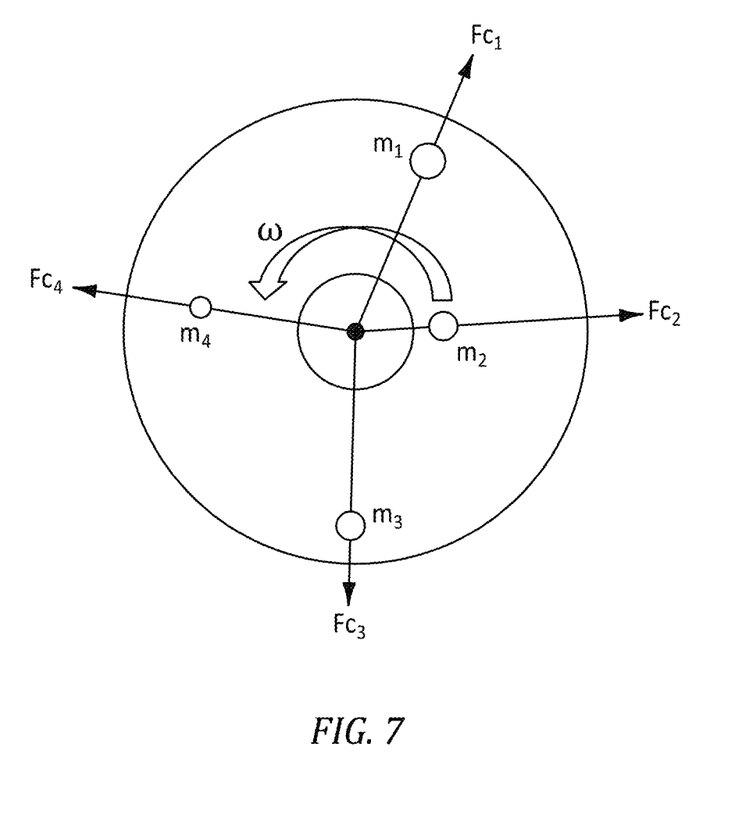
FIG. 7 is a diagrammatic representation of centrifugal forces acting on masses subjected to angular velocity.

When the engine 26 is in assembled form, the rotational spool 48, 50 is rotationally analyzed for imbalances. An imbalance may be determined from sensor input, accelerometer input. In some present disclosure embodiments, the sensor signals representative of the sensed imbalance may be input into an algorithm ("balancing algorithm") based on the relationship between centrifugal force, mass, angular velocity, and mass distance. An example of the relationship that may be used as a basis for the algorithm is as follows:

$$F=m\omega^2 r$$

where: "F" represents centrifugal force acting on a rotating object, "m" represents the mass of the object, "ω" represents the angular velocity of the object, and "r" represents the radial distance of the object from the origin of the rotation. FIG. 7 diagrammatically illustrates an example of a rotational system wherein four different objects, each having its own mass (i.e., $m_1, m_2, m_3, m_4$), each disposed at a different radial distance from the origin, and each disposed at a different circumferential position, are rotated about the origin at an angular velocity "ω". The centrifugal force acting on each object (and therefore collectively on the rotational system) are shown as vectors and are labeled as $Fc_1$, $Fc_2$, $Fc_3$, and $Fc_4$.

In those embodiments wherein the present disclosure includes a balancing algorithm, balancing weight data may be input into the algorithm, including the weight of each balancing weight and the known initial circumferential position of each balancing weight.

The engine 26 may be sensed (e.g., using one or more accelerometers) for an imbalance during an operational cycle that occurs during normal use, or during an operational testing cycle. The algorithm is configured to produce information regarding the presence or absence of an imbalance based on the sensor input. If no imbalance is detected (e.g., no imbalance greater than a predetermined threshold), the algorithm may provide an indication that no adjustment is required. If an imbalance is detected (e.g., an imbalance greater than the predetermined threshold), the algorithm produces information regarding the presence of the imbalance and suggested balance weight 70 positional adjustments to mitigate or eliminate the imbalance. FIG. 5 diagrammatically illustrates balance weights 70 (FBW, SBW, TBW, FBW) attached to the weight channel 168 in an initial configuration at the orthogonal axis positions (i.e., 0°, 90°, 180°, and 270°). FIG. 5A diagrammatically illustrates balance weights 70 (FBW, SBW, TBW, FBW) attached to the weight channel 168 after sensing for an imbalance and a displacement from the initial positions determined for the SBW, the TBW, and the FBW. No displacement was required for the FBW. Once the SBW, TBW, and the FBW are positionally adjusted, the rotational spool may be rotated without an imbalance or with an imbalance that is less than a predetermined threshold.

To adjust the circumferential position of a balance weight 70, the balance weight 70 at issue may be aligned with the ports 74 that are configured to permit access for tooling. The initial circumferential position of the balance weight 70 at issue is known and may be identifiable in degrees using the circumferential position indicator. The position of the inspection ports 74 is also known. Hence, access to the balance weight 70 at issue can be accomplished by rotating the rotational spool 48, 50 until the balance weight 70 at issue is aligned with the ports 74. Once the balance weight 70 and the ports 74 are aligned, tooling may be inserted into the ports 74 to open the ports 74 and thereafter access the balance weight 70. Initially, the balance weight 70 will be in a secured configuration wherein the balance weight 70 is positionally fixed relative to the weight channel 168. Tooling inserted through the ports 74 can be used to actuate the balance weight 70 from the secured configuration to an unsecured configuration. In the unsecured configuration, the balance weight 70 can be translated relative to the weight channel 168; i.e., from the current circumferential position to the desired circumferential position determined to eliminate the imbalance. Once the balance weight 70 at issue is disposed at the desired circumferential position of the weight channel 168, the tooling inserted through the ports 74 can be used to actuate the balance weight 70 from the unsecured configuration to the secured configuration. The process is repeated for each balance weight 70 that must be moved to mitigate/eliminate the imbalance.

The methodology described above permits a user to address an imbalance that may be present in a rotational spool 48, 50 without the need to disassemble the gas turbine engine 26, and without the need to add any balance weights 70 beyond those initially mounted to the track component 68 part of the rotational spool 48, 50. The present disclosure methodology may be performed after the gas turbine engine 26 is initially assembled and operated or may be performed periodically during the operational life of the gas turbine engine 26. A person of skill will recognize that during the operational life of the gas turbine engine 26 imbalances not initially present may develop for a variety of reasons. The present disclosure provides a system and method for sensing and addressing imbalances throughout the life of the gas turbine engine 26, and importantly a system and method that can be practiced with a fully assembled engine 26; e.g., on wing. A person of skill will recognize that many currently available gas turbine engines are configured in a manner that they must be disassembled to address certain rotational spool imbalances. A person of skill will also recognize the time and cost associated with removing a gas turbine engine 26 from an aircraft can be significant. The present disclosure spool balancing system is understood to provide substantial improvements that overcome many of the issues of the prior art.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine, comprising:
   a combustor;
   a rotational spool that includes a turbine section, a compressor section, and a shaft that connects the turbine section and the compressor section, wherein the rotational spool is disposed for rotation about a rotational axis of the gas turbine engine;
   a spool balancing system that includes a circumferentially extending track component and a plurality of balance weights that are engaged with the track component and are disposable in a secured configuration or in an unsecured configuration, wherein the track component and the plurality of balance weights are disposed to rotate with the rotational spool; and
   at least one access port disposed within a non-rotational member of the gas turbine engine, wherein the at least one access port is configured to receive a tool for engagement with the plurality of balance weights.

2. The gas turbine engine of claim 1, wherein the track component is a circumferentially extending channel disposed in a spool component.

3. The gas turbine engine of claim 2, wherein the spool component is a disk cover plate.

4. The gas turbine engine of claim 2, wherein the channel has a dovetail configuration.

5. The gas turbine engine of claim 4, wherein each balance weight of the plurality of balance weights includes a portion that is received within the channel.

6. The gas turbine engine of claim 2, wherein the spool component has a circumference, and the channel extends around an entirety of the circumference.

7. The gas turbine engine of claim 6, wherein in the unsecured configuration the plurality of balance weights are translatable around the entirety of the circumference of the spool component.

8. The gas turbine engine of claim 1, wherein each balance weight of the plurality of balance weights is actuable between the secured configuration and the unsecured configuration.

9. The gas turbine engine of claim 1, wherein each balance weight includes an actuation member configured for rotation, and rotation of the actuation member causes actuation between the secured configuration and the unsecured configuration.

10. The gas turbine engine of claim 1, wherein the turbine section is a high pressure turbine section, and the compressor section is a high pressure compressor section, and the shaft is a high speed shaft.

11. The gas turbine engine of claim 1, wherein the turbine section is a low pressure turbine section, and the compressor section is a low pressure compressor section, and the shaft is a low speed shaft.

12. A gas turbine engine, comprising:
    a combustor section;
    a first rotational spool that includes a first turbine section, a first compressor section, and a first shaft that rotationally connects the first turbine section and the first compressor section, wherein the first rotational spool is disposed for rotation about a rotational axis of the gas turbine engine;

a second rotational spool that includes a second turbine section, a second compressor section, and a second shaft that rotationally connects the second turbine section and the second compressor section, wherein the second rotational spool is disposed for rotation about the rotational axis of the gas turbine engine;

a first spool balancing system that includes a circumferentially extending first track component and a plurality of first balance weights that are engaged with the first track component, wherein the plurality of first balance weights are disposable in a secured configuration or in an unsecured configuration, and wherein the first track component and the plurality of first balance weights are disposed to rotate with the first rotational spool; and at least one first access port disposed within a non-rotational member of the gas turbine engine, wherein the at least one first access port is configured to receive a first tool for engagement with the plurality of first balance weights.

13. The gas turbine engine of claim 12, wherein the first track component is a first channel disposed in a first spool component, and the first spool component has a first circumference.

14. The gas turbine engine of claim 13, wherein the first channel extends around an entirety of the first circumference.

15. The gas turbine engine of claim 14, wherein each first balance weight of the plurality of first balance weight includes a portion that is disposed within the first channel.

16. The gas turbine engine of claim 15, wherein in the unsecured configuration the plurality of first balance weights are translatable around the entirety of the first circumference of the first spool component.

17. The gas turbine engine of claim 12, wherein each first balance weight includes a rotatable actuation member configured to actuate the first balance weight into the secured configuration or into the unsecured configuration.

18. The gas turbine engine of claim 12, further comprising a second spool balancing system that includes a circumferentially extending second track component and a plurality of second balance weights that are engaged with the second track component, wherein the plurality of second balance weights are disposable in a second secured configuration or in a second unsecured configuration, and wherein the second track component and the plurality of second balance weights are disposed to rotate with the second rotational spool.

19. The gas turbine engine of claim 18, further comprising:

a core gas path that extends through the first compressor section, the first compressor section, and the first turbine section, wherein the core gas path through the first turbine section is defined by an outer radial containment structure and an inner radial containment structure; and an engine case disposed radially outside of the core gas path;

wherein the at least one first access port includes a first portal disposed within the engine case, a second portal disposed in the outer radial containment structure, and a third portal disposed in the inner radial containment structure;

wherein the first portal, the second portal, and the third portal are disposed to receive the first tool for engagement with the plurality of first balance weights.

20. The gas turbine engine of claim 19, wherein the second track component is a second channel disposed in a second spool component, and the second spool component has a second circumference, and the second channel extends around an entirety of the second circumference, and in the second unsecured configuration the plurality of second balance weights are translatable around the entirety of the second circumference of the second spool component.

* * * * *